(12) United States Patent
Smith

(10) Patent No.: US 11,291,197 B1
(45) Date of Patent: Apr. 5, 2022

(54) TROTLINE DEPLOYMENT APPARATUS

(71) Applicant: Michael W. Smith, Tiptonville, TN (US)

(72) Inventor: Michael W. Smith, Tiptonville, TN (US)

(*) Notice: Subject to any disclaimer, the term of this patent is extended or adjusted under 35 U.S.C. 154(b) by 390 days.

(21) Appl. No.: 16/357,938

(22) Filed: Mar. 19, 2019

(51) Int. Cl.
*A01K 91/18* (2006.01)

(52) U.S. Cl.
CPC .................................. *A01K 91/18* (2013.01)

(58) Field of Classification Search
CPC ........................................................ A01K 91/18
USPC ............................................ 43/57.3, 27.2, 27.4
See application file for complete search history.

(56) References Cited

U.S. PATENT DOCUMENTS

| | | | | |
|---|---|---|---|---|
| 921,902 A | * | 5/1909 | Smith | A01K 91/08 43/27.4 |
| 1,221,904 A | * | 4/1917 | Potier | A01K 91/18 43/57.3 |
| 1,997,243 A | * | 4/1935 | Vanderhider | A01K 91/18 43/57.3 |
| 2,100,763 A | * | 11/1937 | Kersenbrock | A01K 91/18 43/57.3 |
| 2,531,643 A | * | 11/1950 | Pringle | A01K 91/18 43/27.4 |
| 2,555,397 A | * | 6/1951 | Coward | A01K 91/18 43/57.3 |
| 2,599,113 A | * | 6/1952 | Latta | A01K 91/18 43/57.3 |
| 2,633,661 A | * | 4/1953 | Stevens | A01K 91/18 43/57.3 |
| 2,670,565 A | * | 3/1954 | Platt | A01K 91/18 43/57.3 |
| 2,857,706 A | * | 10/1958 | Skains | A01K 91/18 43/27.4 |
| 3,047,978 A | * | 8/1962 | Glover | A01K 91/18 43/57.3 |
| 3,060,622 A | * | 10/1962 | Lowry | A01K 91/18 43/57.3 |

(Continued)

FOREIGN PATENT DOCUMENTS

| | | | | |
|---|---|---|---|---|
| CA | 2777828 C | * | 11/2013 | ............. A01K 91/18 |
| DE | 1817621 A1 | * | 7/1970 | ............. A01K 91/18 |

(Continued)

*Primary Examiner* — Darren W Ark
(74) *Attorney, Agent, or Firm* — Goldstein Law Offices, P.C.

(57) ABSTRACT

A trotline deployment apparatus for safely deploying a trotline from a watercraft, the trotline having a plurality of hooks each attached to the trotline via a trotter line and a swivel, comprising a trotline canister, and a support frame having an upper assembly and a base. The trotline canister has an interior space adapted to foldably store the trotline, an opening which allows the trotline to be pulled away from the interior space, and a guide slot which sequentially engages the swivels and prevents the trotline from becoming entangled. The trotline canister is detachably secured to the upper assembly via a retaining collar. A hook holder adapted to selectively enclose the hooks prevents unintentional contact with the hooks. The upper assembly further has one or more hook separator arms from which the hooks are suspended and separated to facilitate application of bait.

19 Claims, 10 Drawing Sheets

(56) References Cited

U.S. PATENT DOCUMENTS

| | | | | |
|---|---|---|---|---|
| 3,104,489 A * | 9/1963 | Ford | .............. | A01K 91/18 43/57.3 |
| 3,466,785 A * | 9/1969 | Shook | .............. | A01K 91/18 43/27.4 |
| 3,775,894 A * | 12/1973 | Goddard | .............. | A01K 91/18 43/57.3 |
| 3,818,625 A * | 6/1974 | Shults | .............. | A01K 91/18 43/27.4 |
| 3,842,530 A * | 10/1974 | Jackson | .............. | A01K 91/18 43/57.3 |
| 3,945,144 A * | 3/1976 | Purselley | .............. | A01K 91/18 43/57.3 |
| 4,354,323 A * | 10/1982 | Huff | .............. | A01K 91/18 43/4 |
| 4,461,112 A * | 7/1984 | Jacobsen | .............. | A01K 91/18 43/4 |
| 4,525,949 A * | 7/1985 | Pike | .............. | A01K 91/18 43/57.3 |
| 4,630,388 A * | 12/1986 | Furlong | .............. | A01K 91/18 43/27.4 |
| 4,685,243 A * | 8/1987 | Pugh | .............. | A01K 91/18 43/57.3 |
| 4,827,659 A * | 5/1989 | Gulley | .............. | A01K 91/18 206/315.11 |
| 4,945,671 A * | 8/1990 | Jonsson | .............. | A01K 91/18 43/44.84 |
| 5,107,618 A * | 4/1992 | Cummings | .............. | A01K 91/18 43/57.3 |
| 5,291,681 A * | 3/1994 | Bjornson | .............. | A01K 91/18 242/224 |
| 5,345,709 A * | 9/1994 | Cummings | .............. | A01K 91/18 43/57.3 |
| 6,122,858 A * | 9/2000 | Beaston | .............. | A01K 91/18 43/57.3 |
| 2014/0053449 A1 | 2/2014 | Martin | | |

FOREIGN PATENT DOCUMENTS

| | | | | |
|---|---|---|---|---|
| EP | 0248741 B1 * | 2/1991 | .............. | A01K 91/18 |
| EP | 0225687 B1 * | 7/1991 | .............. | A01K 91/18 |
| FR | 2599721 B1 * | 6/1990 | .............. | A01K 91/18 |
| FR | 2829664 B1 * | 12/2003 | .............. | A01K 97/06 |
| FR | 3070825 A3 * | 3/2019 | .............. | A01K 91/18 |
| GB | 2124863 B * | 8/1985 | .............. | A01K 91/18 |
| GB | 2124865 B * | 10/1985 | .............. | A01K 91/18 |
| GB | 2186772 B * | 9/1990 | .............. | A01K 91/18 |
| KR | 20090048532 A * | 5/2009 | | |
| KR | 200454216 Y1 * | 6/2011 | | |
| KR | 101169362 B1 * | 7/2012 | | |
| KR | 101169363 B1 * | 7/2012 | | |
| KR | 101247709 B1 * | 3/2013 | | |
| WO | WO-8403687 A1 * | 9/1984 | .............. | B65G 17/40 |
| WO | WO-9116817 A1 * | 11/1991 | .............. | A01K 91/18 |
| WO | WO-9209194 A1 * | 6/1992 | .............. | A01K 91/18 |
| WO | WO-0238439 A1 * | 5/2002 | .............. | A01K 91/02 |
| WO | WO-2011051588 A1 * | 5/2011 | .............. | A01K 97/06 |

\* cited by examiner

TROTLINE DEPLOYMENT APPARATUS

TECHNICAL FIELD

The present disclosure relates generally to an apparatus for deploying a trotline. More particularly, the present disclosure relates to a trotline deployment apparatus for loading, storing, and deploying a trotline while minimizing contact between the trotline and a user.

BACKGROUND

Trotlines are often employed by skilled fishermen to catch many fish at once. Trotlines have many hooks suspended from a mainline via trotter lines, and may be a hundred yards in length or more. Typically, a trotline is deployed from a watercraft by securing one end to an anchoring point on land or submerged weight, and extending the trotline while moving away from the anchoring point. Bait is usually applied to each hook while the trotline is deployed. The great length of the trotline creates a risk of entanglement during handling, storage, and deployment, while the multitude of hooks make the trotline hazardous to touch. Furthermore, should the trotline become entangled during deployment, the motion of the watercraft away from the anchoring point may cause the trotline to snap, causing one half of the broken line, along with the exposed hooks, to whip backwards towards the user.

The prior art contains examples of devices intended to facilitate the safe deployment of trotlines. For example, several prior art devices utilize elongated tubes to sequentially store trotline hooks inside the tubes while the mainlines and trotters hang downwardly from the device. Although these devices do present one solution for storing trotlines and preventing entanglement, they do not address the difficult and hazardous process of applying bait to the hooks as the trotline is in the process of being deployed while the watercraft is in motion. Furthermore, many of the devices within the prior art are handheld, requiring the cooperation of multiple people to deploy and bait the trotline. Lastly, none of the devices currently found within the prior art address the danger posed by the snapping of an entangled trotline.

A need therefore exists for an apparatus which not only allows trotlines to be safely stored and deployed by a single user while minimizing entanglement, but which also allows the hooks to be safely and easily baited prior to deployment and prevents snagged lines from snapping and injuring the user.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an apparatus for safely deploying a trotline having a plurality of trotters and fishing hooks from a watercraft without contact between a user and the trotline as it is deployed. Accordingly, the present disclosure provides a trotline canister having an interior space adapted to foldably store the trotline, a guide slot through which the trotters are suspended, and an opening which allows the trotline to be pulled outwardly away from the interior space. The trotline canister is held in place on the watercraft by a support frame having a retaining collar. By securing the trotline to an anchoring point and causing the watercraft to move away from the anchoring point, the trotline is pulled through the opening allowing the hooks to fall into the water without any contact by the user.

It is another aspect of an example embodiment in the present disclosure to provide a trotline canister which prevents the trotline from becoming entangled during loading and deployment. Accordingly, the present disclosure provides a guide slot which is adapted to slidably engage a plurality of swivels from which the trotters are suspended such that the swivels are arranged sequentially in single file, thus preventing the trotters from exiting the trotline canister out of sequence to entangle the trotline.

It is yet another aspect of an example embodiment in the present disclosure to prevent injury caused by accidental contact with the hooks. Accordingly, the present disclosure provides a hook holder having a first and second panel which selectively enclose the hooks suspended below the trotline canister, thereby preventing unintentional contact with the hooks.

It is a further aspect of an example embodiment in the present disclosure to provide a support frame which facilitates the placement of bait upon the hooks. Accordingly, the present disclosure provides one or more hook separator arms positioned on the support frame beneath the trotline canister. The hook separator arms are positioned below the trotline canister and project forwardly, allowing the trotters and hooks to be hung therefrom to create a separation distance between the trotters, thereby facilitating placement of bait upon the hooks.

It is still a further aspect of an example embodiment in the present disclosure to provide a trotline canister which selectively elevates and depresses. Accordingly, the retaining collar is attached to the support frame via an elevating hinge, allowing the trotline canister to elevate or depress between a level position, an elevated position, and an intermediate position therebetween.

It is yet a further aspect of an example embodiment in the present disclosure to provide a trotline deployment apparatus which prevents the trotline from snapping upon the trotline becoming entangled during deployment. Accordingly, the retaining collar is adapted to detachably retain the trotline canister, allowing the trotline canister to be pulled away from the retaining collar upon the trotline becoming snagged during deployment.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
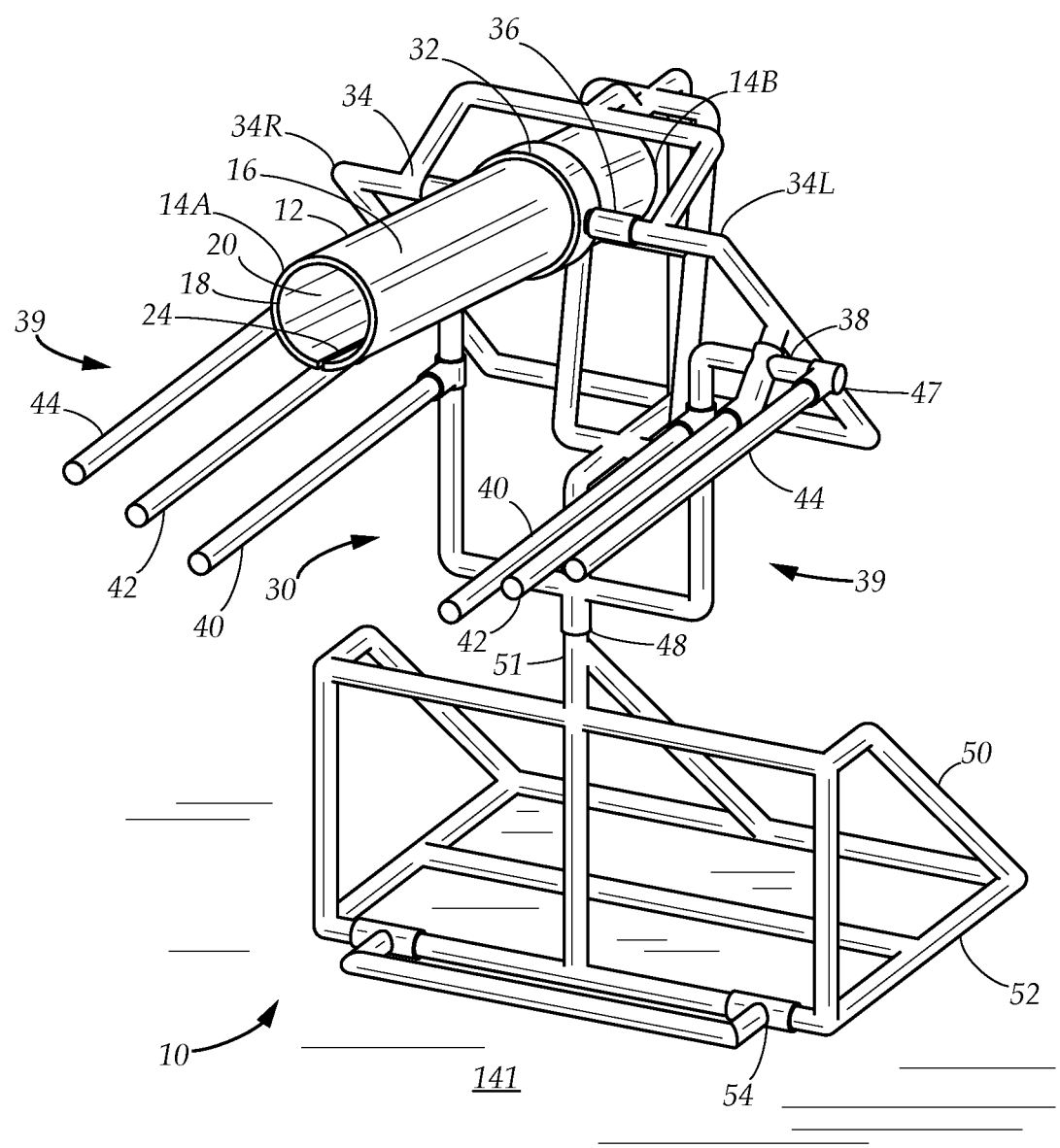
FIG. 1 is a diagrammatical perspective view of a trotline deployment apparatus comprising a trotline canister detachably mounted within a support frame having a pivoting upper assembly and a base, in accordance with an embodiment of the present disclosure.

FIG. 1 illustrates a trotline deployment apparatus 10 comprising a trotline canister 12 detachably mounted to a support frame 30. The support frame 30 has an upper assembly 34 and a base 50. The upper assembly 34 has a retaining collar 32 which detachably holds the trotline canister 12, while the upper assembly 34 is pivotally connected to the base 50 and is adapted to pivot laterally in relation to the base 50. Referring to FIG. 7, FIGS. 10A-B, and FIG. 11, the trotline deployment apparatus 10 is adapted to safely store and deploy a trotline 70 having a mainline 71, a plurality of trotters 72 suspended from the mainline 71, and a plurality of hooks 78, with each hook 78 suspended from one of the trotters 72. The support frame 30 is adapted to be positioned within a watercraft 140 such as a boat, where the base 50 is adapted to rest upon a supporting surface 141 of the watercraft such as a deck, floor, or platform. The watercraft 140 has a bow 144A, a stern 144B, and a right side 144R and left side 144L. The watercraft 140 may also have a motor 146 which may be positioned at the stern 144B. The support frame 30 has a front 30F and a rear 30R, and is ideally positioned to face either the bow 144A or the stern 144B of the watercraft 140. The trotline canister 12 has an interior space 20 adapted to store the trotline 70, and an opening 18 which allows the trotline 70 to be pulled away from the interior space 20 such that the hooks 78 are allowed to descend towards and be submerged within a body of water 141 to catch fish, while minimizing the need for a user to contact the trotline 70 or the hooks 78.

Referring to FIG. 1, FIG. 5, and FIGS. 7-8, the trotline canister 12 has a first end 14A, a second end 14B, and a shell 16 extending therebetween. The shell 16 is preferably cylindrical in shape, and is substantially hollow and has an outer surface 20C, and an inner surface 20B which defines the interior space 20. The interior space 20 opens forwardly through the opening 18 which is positioned at the first end 14A. The trotline canister 12 further has a guide slot 24 positioned along the shell 16 which extends from the first end 14A towards the second end 14B and is downwardly oriented. The guide slot 24 has a guide slot opening 24B positioned at the opening 18 of the trotline canister 12. The mainline 71 has a mainline first end 71A and a mainline second end 71B. Each trotter 72 is secured to the mainline 71 via a swivel 76, and the trotters 72 are arranged in sequence between the mainline first and second ends 71A, 71B. The mainline 71 is stored within the interior space 20 with the mainline second end 71B positioned towards the second end 14B of the trotline canister and the first end 14A positioned towards the opening. Each swivel 76 has a rotation mechanism 76B positioned between the mainline 71 and the trotters 72, and the rotation mechanism 76B has a thickness which exceeds a width of the guide slot 24. Each swivel 76 is slidably engaged within the guide slot 24, and the rotation mechanism 76B rests upon the inner surface 20B while the trotter 72 extends through the guide slot 24 to allow the hook 78 to hang below the trotline canister 12. The plurality of trotters 72 are therefore sequentially secured within the guide slot 24 and are prevented from becoming pushed out of sequence. Furthermore, the mainline second end 71B may terminate in an end knot 71K having a width exceeding the width of the guide slot 24. When the trotline 70 is stored within the trotline canister 12, the mainline second end 71B projects downwardly through the guide slot 24, while the end knot 71K prevents the mainline second end 71B from retracting through the guide slot 24 into the interior space 20.

When the trotline 70 is deployed, the mainline first end 71A is pulled away from the first end 14A of the trotline canister 12, causing the swivel 76 of each trotter 72 to advance along the guide slot 24 towards the opening 18 of the trotline canister 12. Once each swivel 76 reaches the guide slot opening 24B, the swivel 76 disengages from the guide slot 24, allowing the trotter 72 and the hook 78 to fall free from the trotline canister 12. The plurality of swivels 76 and trotters 72 successively and sequentially disengage from the guide slot 24 through the guide slot opening 24B, thus preventing the trotline 70 from becoming entangled as it deploys. Simultaneously, the mainline 71 unfolds within the interior space 20 and exits through the opening 18.

Figure 6:
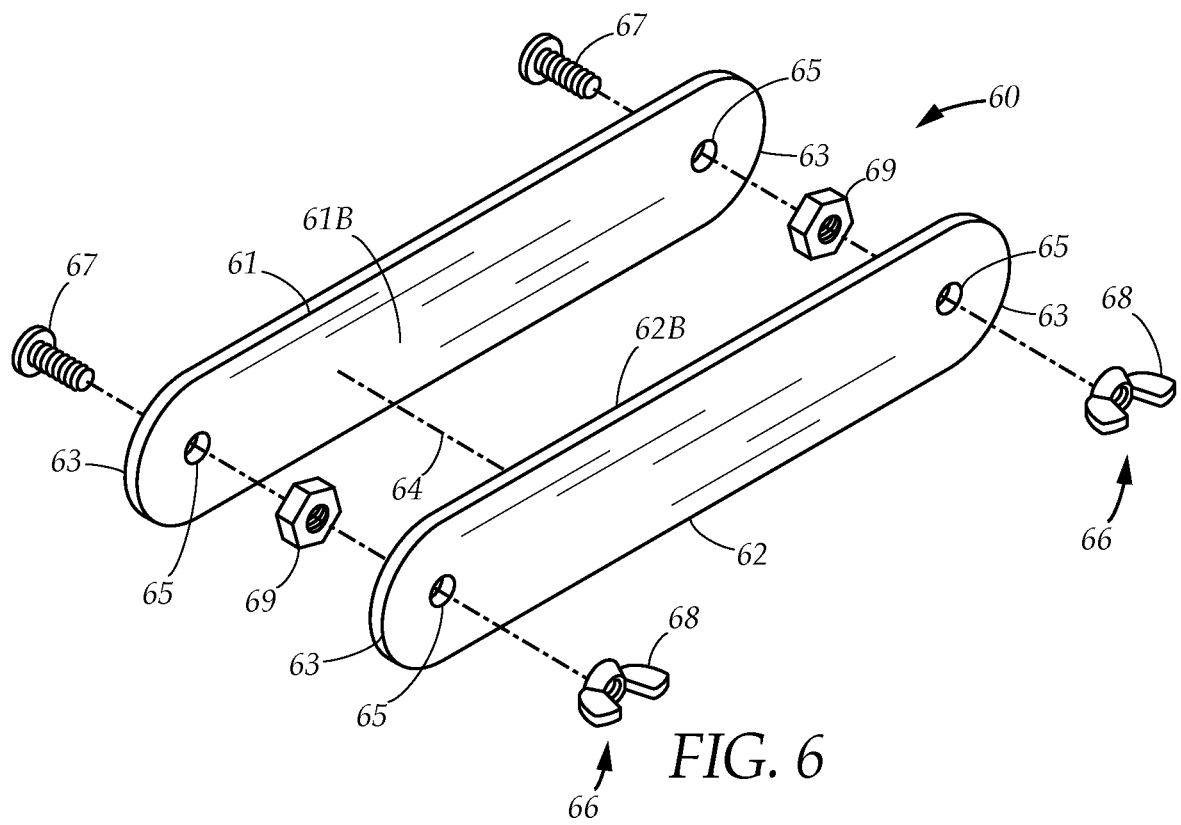
FIG. 6 is a diagrammatical exploded view of a hook holder, comprising a first panel and a second panel which are pivotally fastened to form a hook retaining space, in accordance with an embodiment of the present disclosure.

Referring to FIG. 6 as well as FIGS. 7-8. the trotline deployment apparatus 10 further comprises a hook holder 60 adapted to enclose the plurality of hooks 78 while they are suspended below the trotline canister 12. The hook holder 60 has a first panel 61 and a second panel 62, which are each elongated in shape and have a pair of distally oriented panel ends 63. The first panel 61 has a first panel inner face 61B while the second panel 62 has a second panel inner face 62B, and the first and second panels 61, 62 are adapted to attach together in parallel such that the first panel inner face 61B faces and is adjacent to the second panel inner face 62B, forming a central hook retaining space 64 therebetween. The plurality of hooks 78 are selectively contained within the central hook retaining space 64, thereby safely enclosing the hooks 78 and preventing injury resulting from unintended contact with the hooks. Detaching the first and second panels 61, 62 reveals the hooks 78 and allows the hooks 78 to be baited. In a preferred embodiment, the first and second panels 61, 62 are joined together by a pair of distally oriented pivoting fasteners 66 at each panel end 63, each comprising a bolt 67, a nut 68, and a spacer 69 such as a nut or washer. The pivoting fasteners 66 each pass through fastener holes 65 positioned proximate to the panel ends 63. The spacer 69 separates the first and second panels 61, 62 to create the central hook retaining space 64, while the bolt 67 and nut 68 pass through the spacer 69 and the first and second panels 61, 62, and press the first and second panels inwardly against the spacer 69. Unfastening one of the pivoting fasteners 66 will allow the first and second panels 61, 62 to freely pivot about the pivoting fastener 66 which remains fastened at the opposite panel end 63. To enclose the hooks 78 within the hook holder 60, the user may place the hooks 78 suspended below the guide slot 24 against the first or second panel inner face 61B, 62B, align the first and second panels 61, 62, by pivoting the panels about the fastened pivoting fastener 66, and then fasten the unfastened pivoting fastener 66 to secure the hooks 78 within the central hook retaining space 64. The hook holder 60 may have a length equal to or greater than the length of the guide slot 24, allowing the hook holder 60 to enclose all the hooks 78 suspended below the guide slot 24.

Figure 8:
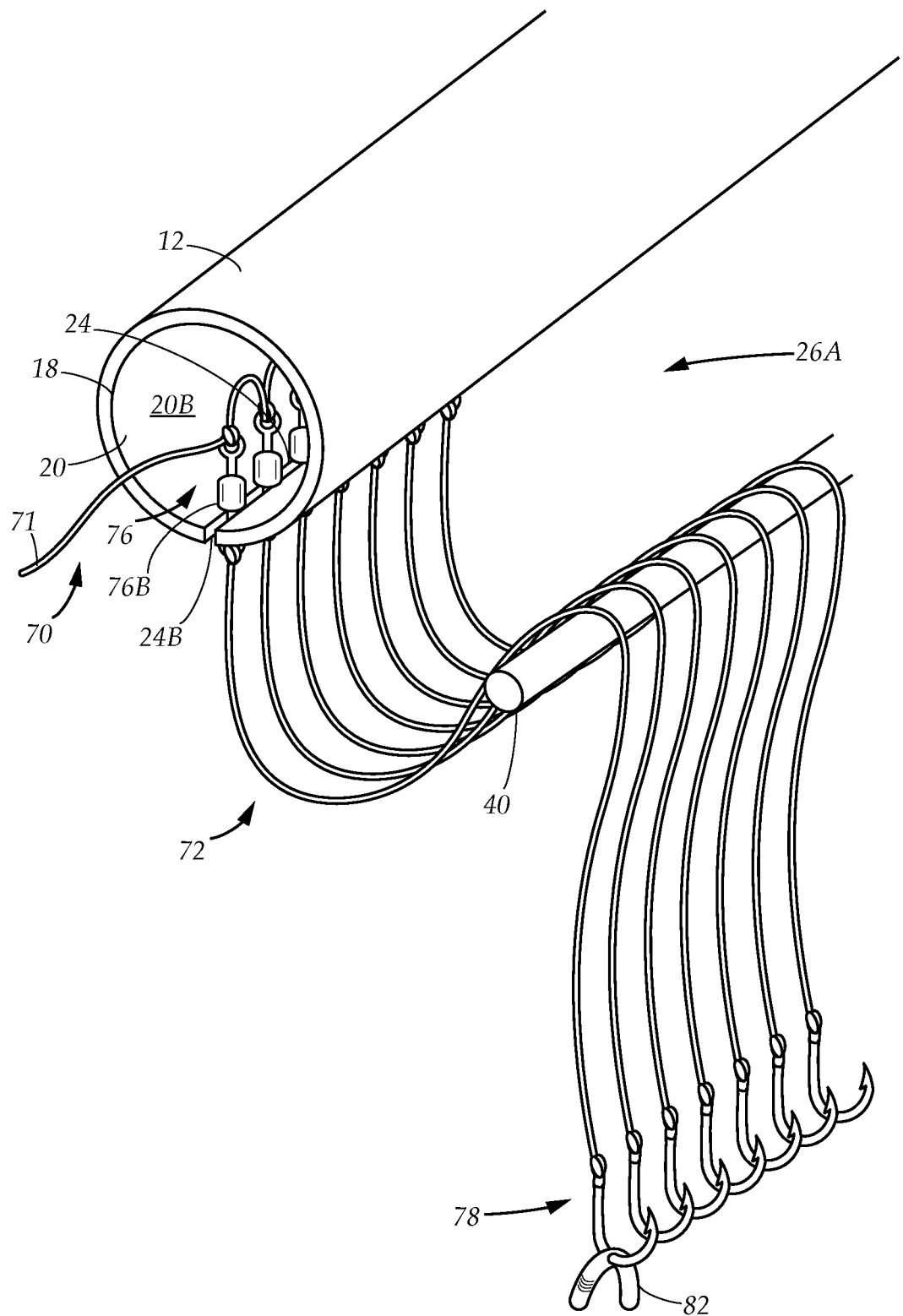
FIG. 8 is a diagrammatical perspective view of the trotline canister positioned parallel to the inner hook separator arm, showing the trotters hanging over the inner hook separator arm at spaced intervals to prevent entanglement, in accordance with an embodiment of the present disclosure.

Referring now to FIG. 1 and FIG. 8, the upper assembly 34 of the support frame 30 further has one or more arm frames 38 each adapted to support one or more hook separator arms 39. Each hook separator arm 39 is positioned below and to the right 34R or the left 34L of the retaining collar 32 creating a lateral separation in relation to the retaining collar 32, and projects forwardly away from the upper assembly 34. The hook separator arms 39 are oriented in parallel to the trotline canister 12 when the trotline canister 12 is inserted within the retaining collar 32. The hook separator arms 39 may comprise an inner hook separator arm 40 oriented towards the retaining collar 32, an outer hook separator arm 44, and a middle hook separator arm 42 positioned between the inner and outer hook separator arms 40, 44. When the trotters 72 and hooks 78 are suspended below the trotline canister 12, each trotter 72 may be hung from any of the hook separator arms 39. For example, the user may hang each trotter 72 from the inner hook separator arm 40 such that the inner hook separator arm 40 contacts the trotter 72 between the hook 78 and the swivel 76, allowing the hook 78 to be suspended from the inner hook separator arm 40. The plurality of hooks 78 suspended from the inner hook separator arm 40 are separated from each other by a separation distance, which can be increased or decreased by sliding the trotters 72 along the inner hook separator arm 40. Suspending the trotters 72 and hooks 78 from the hook separator arms 39 prevents the hooks 78 from becoming entangled, and increasing the separation distance allows the user to apply bait 82 to one of the hooks 78 without accidentally contacting and being injured by another hook. Furthermore, in certain situations, hanging the trotters 72 over the hook separator arms 39 prevents the hooks 78 from contacting the supporting surface 141.

The arm frames 38 further allow the hook separator arms 39 to be raised or pivoted laterally when not in use to allow the user to access the retaining collar 32 and the trotline canister 12.

Each of the hook separator arms 39 may have a different height in relation to the height of the retaining collar 32 and the trotline canister 12. In a preferred embodiment, the height of the inner hook separator arm 40 is the lowest, while the height of the outer hook separator arm 44 is greater than the height of the inner and middle hook separator arms 40, 42. Each trotter 72 may have a different length, and may be hung from the hook separator arm 39 that is sufficiently high to prevent the hooks 78 from contacting the supporting surface 141. For example, trotters 72 with shorter lengths may be hung from the inner hook separator arm 40 while trotters with longer lengths may be hung from the middle or outer hook separator arms 42, 44.

Figure 2:
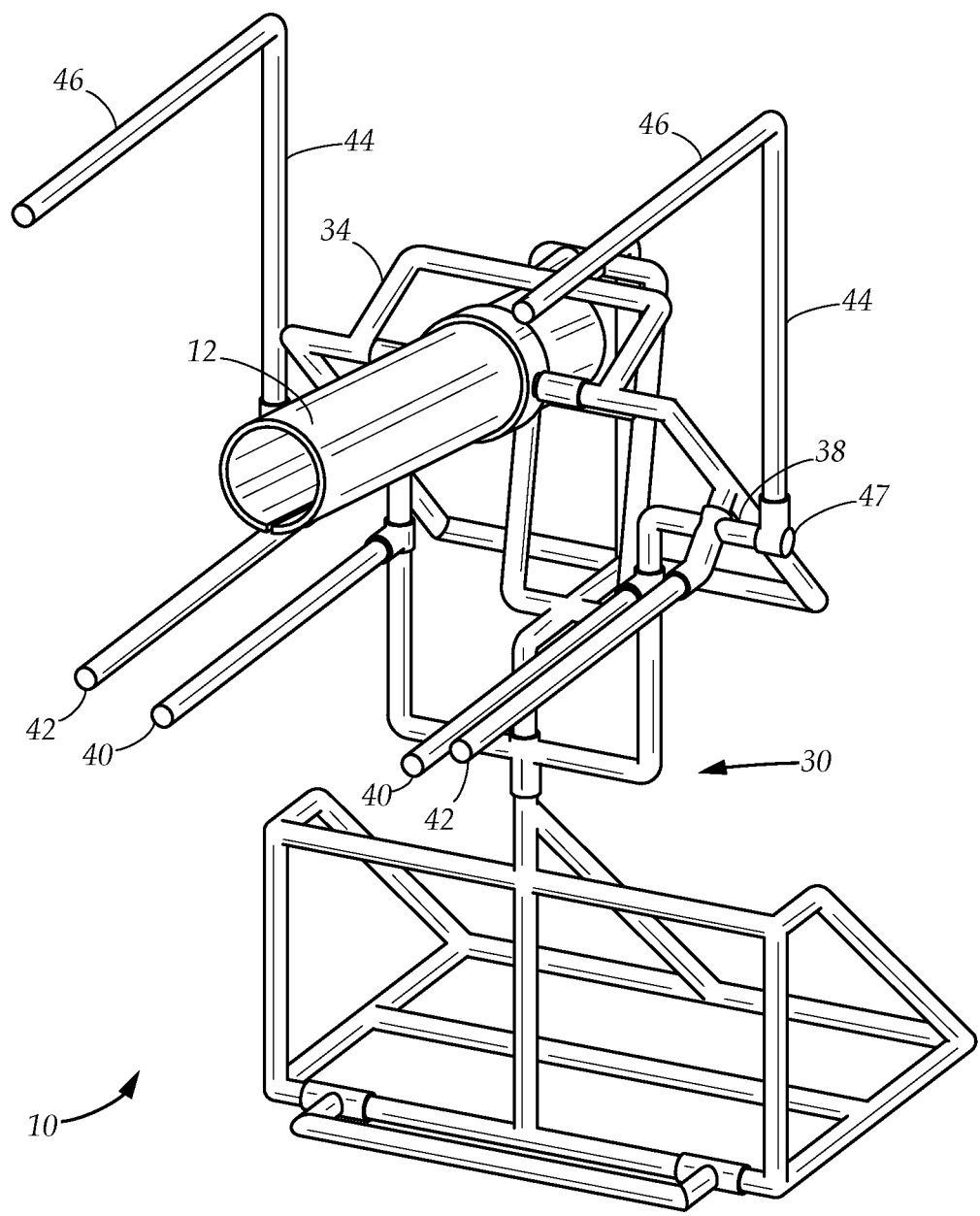
FIG. 2 is a diagrammatical perspective view of the trotline deployment apparatus, further showing a plurality of forwardly projecting hook separator arms extending away from the upper assembly, including a pair of elevated hook separator arms, in accordance with an embodiment of the present disclosure.
Figure 9A:
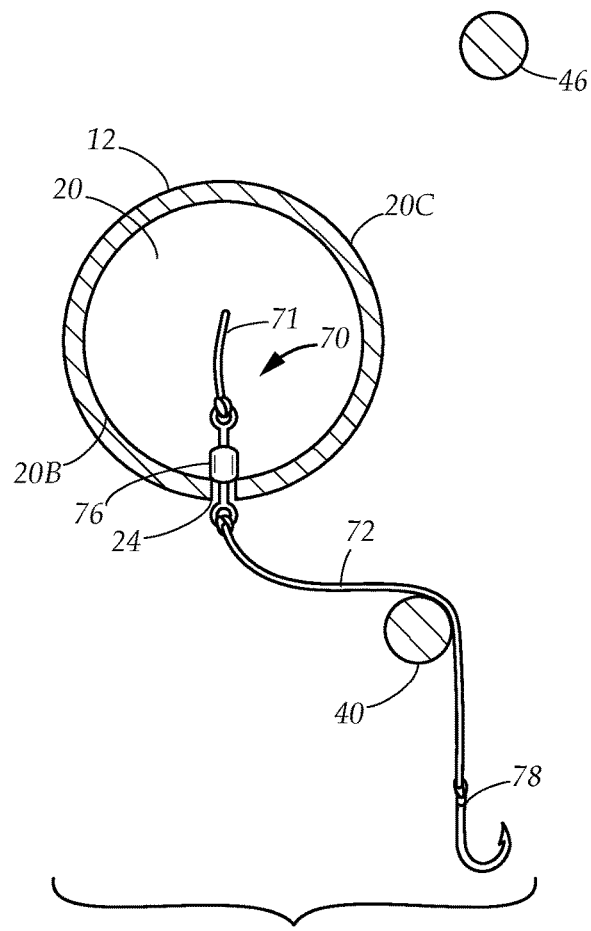
FIG. 9A is a diagrammatical front view showing one of the elevated hook separator arms in relation to the trotline canister and the inner hook separator arm, in accordance with an embodiment of the present disclosure.
Figure 9B:
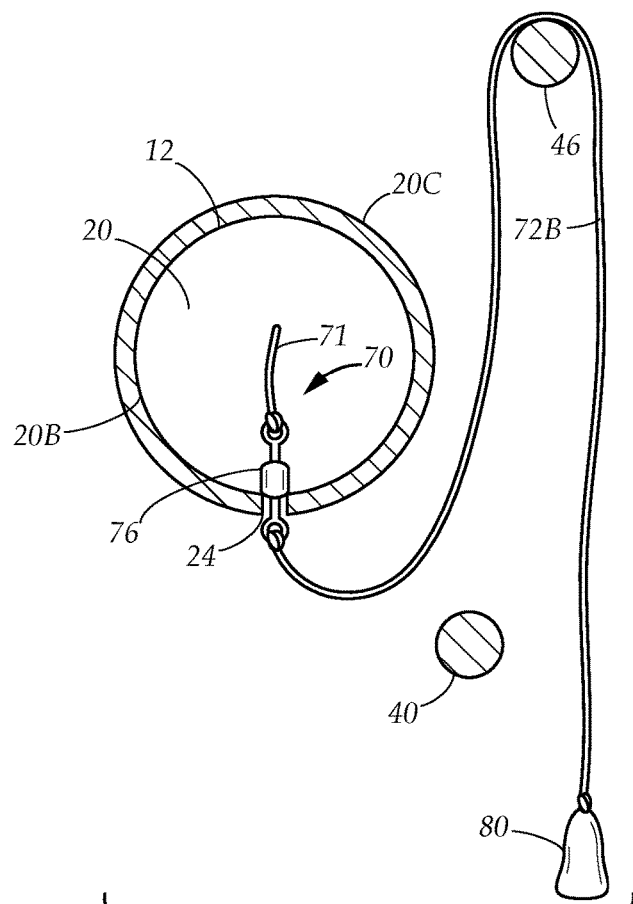
FIG. 9B is a diagrammatical front view showing a trotter hanging from the elevated hook separator arm with a weight suspended therefrom, in accordance with an embodiment of the present disclosure.
Figure 10A:
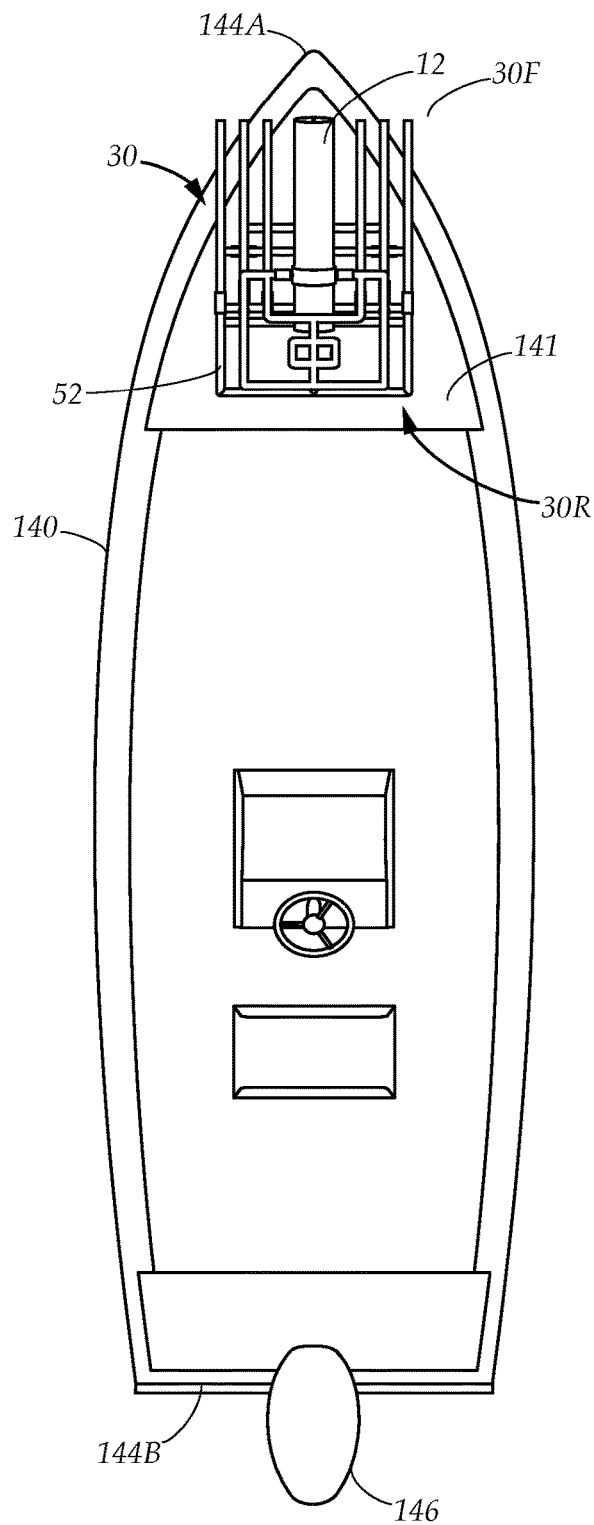
FIG. 10A is a diagrammatical top view of the trotline deployment apparatus positioned at the bow of a watercraft, in accordance with an embodiment of the present disclosure.
Figure 10B:
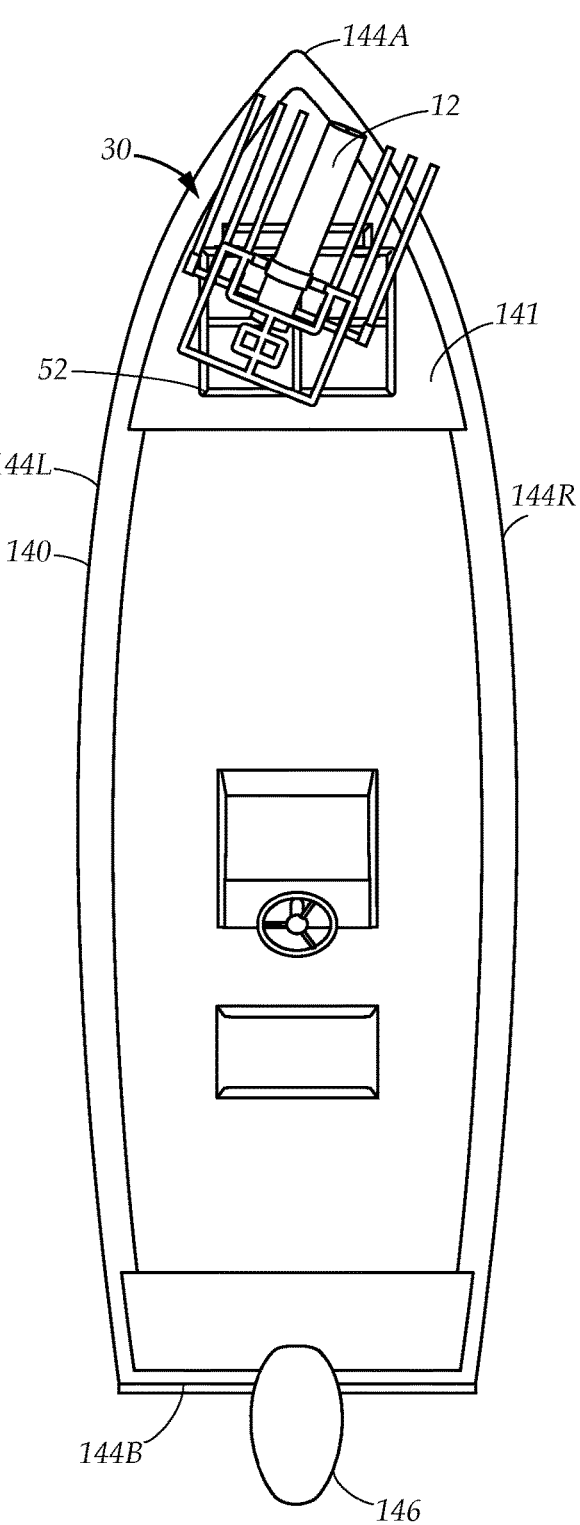
FIG. 10B is a diagrammatical top view of the trotline deployment apparatus with the upper assembly pivoted towards the right of the watercraft, in accordance with an embodiment of the present disclosure.

Turning to FIG. 2 while also referring to FIG. 1 and FIGS. 9A-B, the hook separator arms 39 may also comprise one or more elevated arms 46 which have a height greater than the height of the retaining collar 32 and the trotline canister 12. In one embodiment, the outer hook separator arm 44 may be raised upwardly into a vertical position, and the elevated arm 46 may be attached perpendicularly to the outer hook separator arm 44. The trotline 70 may have a dropline 72B suspended from the mainline 71 via a swivel 76, which has a length exceeding the length of the trotters 72. A weight 80 is suspended from the dropline 72B. In a preferred embodiment, the dropline 72B is hung from the elevated arm 46, thereby preventing the weight 80 from contacting the supporting surface 141 and allowing the weight 80 to be suspended separately from the hooks 78.

Figure 4A:
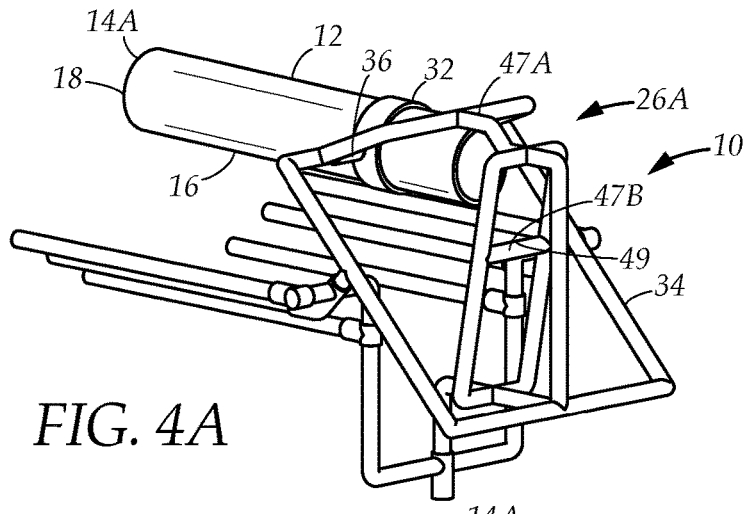
FIG. 4A is a diagrammatical perspective view of the upper assembly shown from the rear, showing the trotline canister inserted within a retaining collar which is selectively elevated via an elevation hinge, in accordance with an embodiment of the present disclosure. The trotline canister is shown in a level position.
Figure 4B:
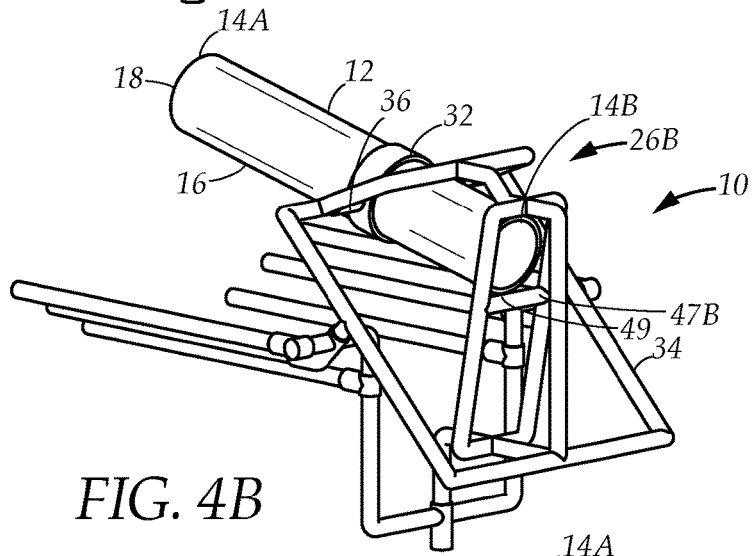
FIG. 4B is a diagrammatical perspective view of the upper assembly shown from the rear, showing the trotline canister in an intermediate position.
Figure 4C:
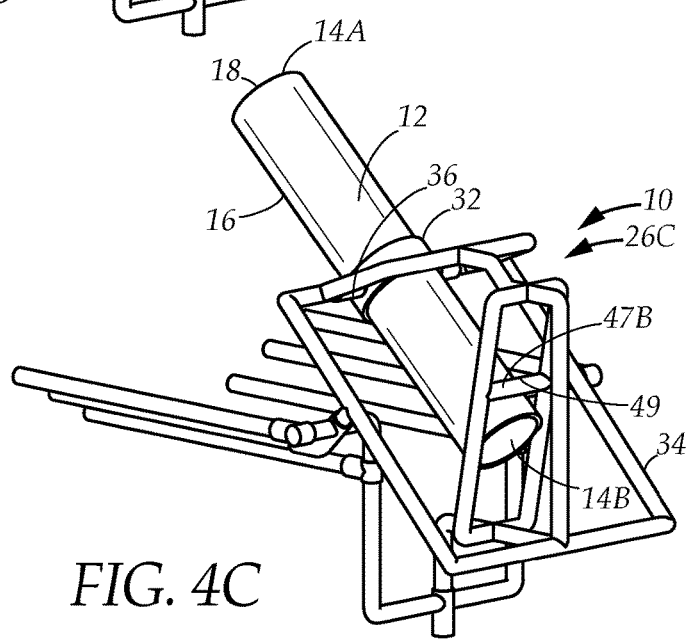
FIG. 4C is a diagrammatical perspective view of the upper assembly shown from the rear, showing the trotline canister in an elevated position.
Figure 7:
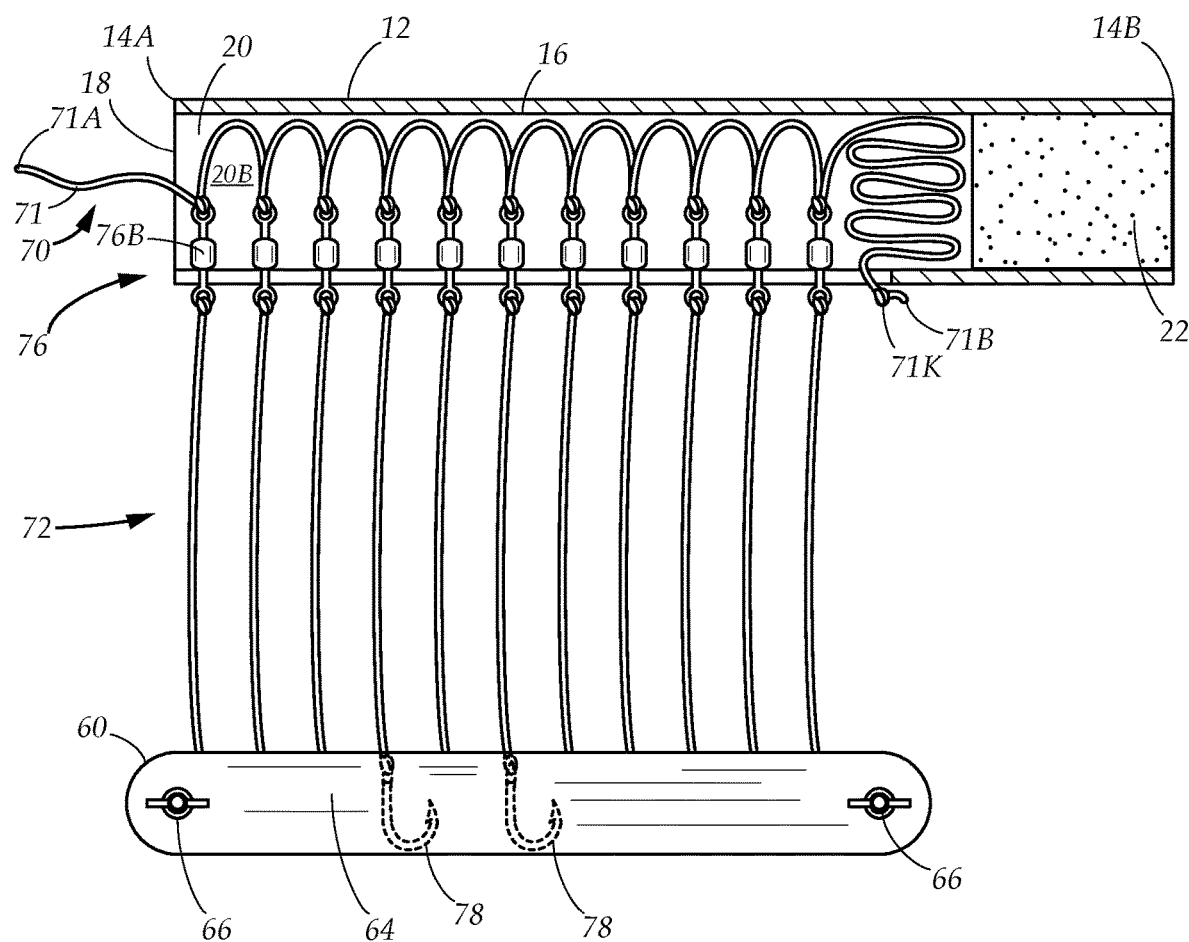
FIG. 7 is a diagrammatical cross-section view of the trotline canister, showing a plurality of trotters and hooks suspended from a trotline stored within the interior space of the trotline canister, whereby each trotter is suspended from a swivel engaged within the guide slot, further showing the hook holder enclosing the hooks, in accordance with an embodiment of the present disclosure.
Figure 11:
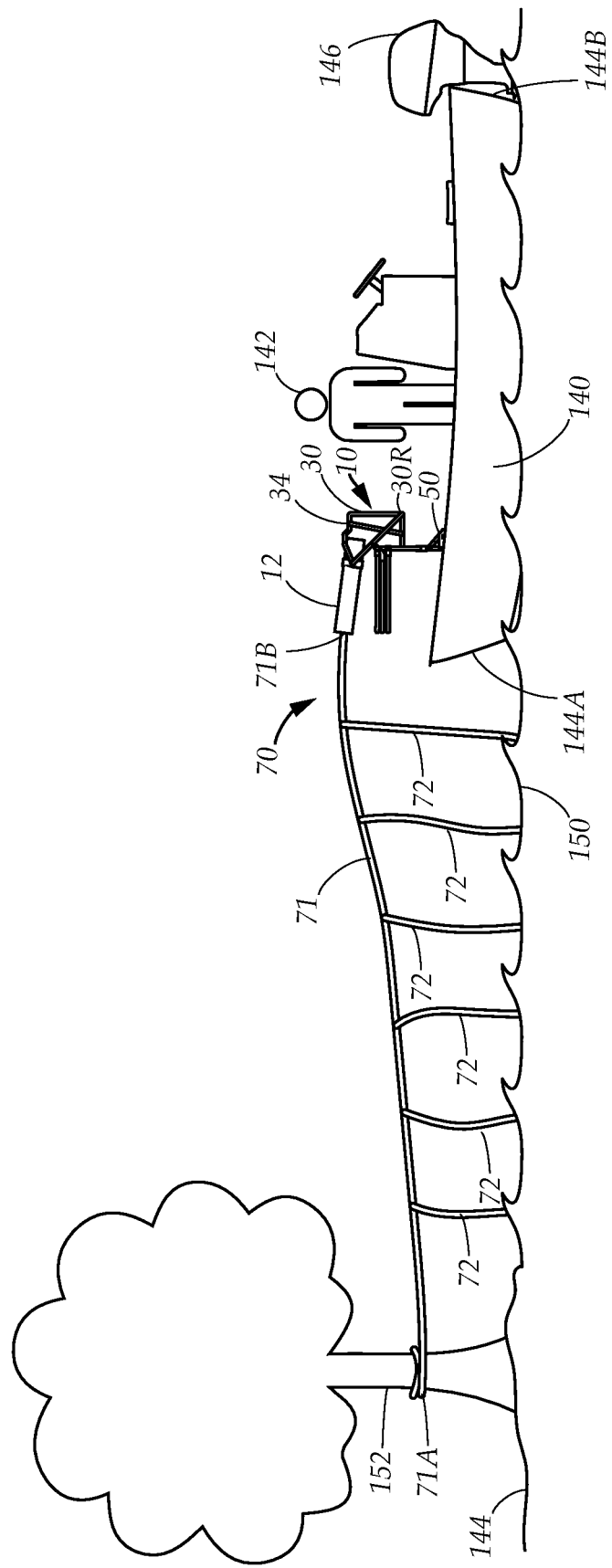
FIG. 11 is a diagrammatical side view showing the trotline deployment apparatus in the process of deploying a trotline over a body of water, in accordance with an embodiment of the present disclosure.

Turning now to FIGS. 4A-C while also referring to FIGS. 1, 7, and 11, the upper assembly 34 has an elevation hinge 36 which allows the retaining collar 32, and the trotline canister 12 retained therein to elevate upwardly or depress downwardly between a level position 26A substantially parallel with the hook separator arms 39 and/or the supporting surface 141, an elevated position 26C where the first end 14A of the trotline canister 12 points away from the supporting surface 141, and an intermediate position 26B between the level and elevated positions 26A, 26C. For example, the elevated position 26C may be between forty-five to ninety degrees, while the intermediate position 26B may be approximately fifteen to thirty degrees in relation to the level position 26A. In addition to being elevated or depressed via the elevation hinge 36, the trotline canister 12 is further adapted to alternatively slide inwardly and outwardly within the retaining collar 32.

The upper assembly further has an elevation locking frame 49, an upper elevation limit bar 47A, and a lower elevation limit bar 47B, positioned behind the retaining collar 32. The upper elevation limit bar 47A is positioned above the retaining collar 32. When the trotline canister 12 is placed in the level position 26A, the second end 14B of the trotline canister 12 contacts the upper elevation bar 47A, to prevent the trotline canister 12 from being depressed downwardly past the level position. The lower elevation limit bar 47B is positioned below the retaining collar 32. When the trotline canister 12 is in the elevated position 26C, the second end 14B may slide inwardly through the retaining collar to extend below the lower elevation limit bar 47B. The lower elevation limit bar 47B prevents the trotline canister 12 from being depressed downwardly away from the elevated position as the lower elevation bar 47B abuts against the shell 16 proximate to the second end 14B. The elevation locking frame 49 is positioned between the upper and lower elevation bars 47A, 47B. When the trotline canister 12 is placed in the intermediate position 26B, the trotline canister may slide inwardly through the retaining collar 32 until the second end 14B engages with the elevation locking frame 49, which prevents the trotline canister 12 from being elevated or depressed. Additionally, the elevation locking frame 49 is further adapted to prevent the trotline canister 12 from rotating axially within the retaining collar 32. In a preferred embodiment, the elevation locking frame 49 is rectangular in shape. Alternatively, the elevation locking frame 49 may be any shape adapted to securely engage the second end 14B and prevent the trotline canister 12 from being moved.

Figure 3A:
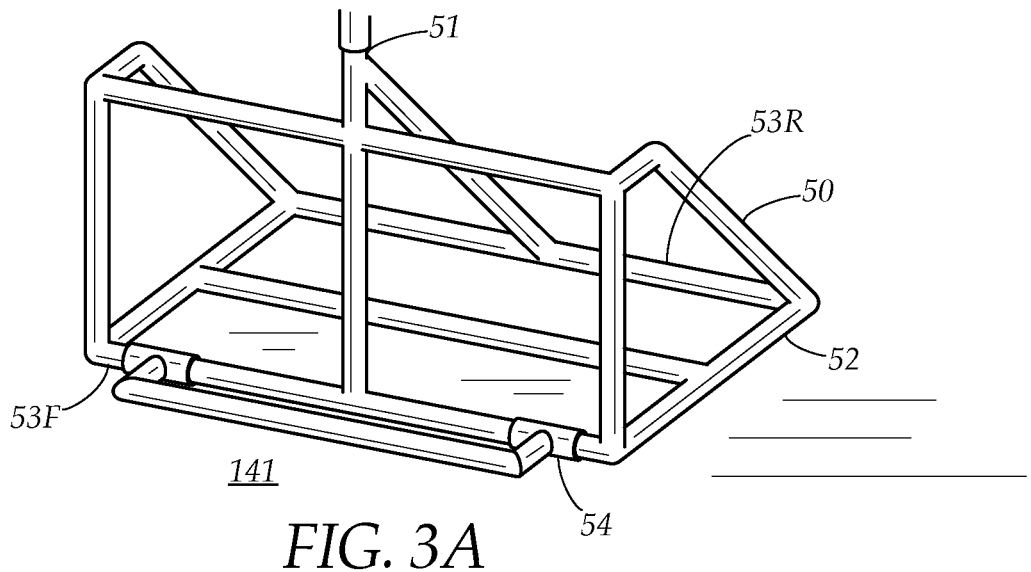
FIG. 3A is a diagrammatical perspective view of the base of the support frame resting upon a supporting surface, in accordance with an embodiment of the present disclosure.
Figure 3B:
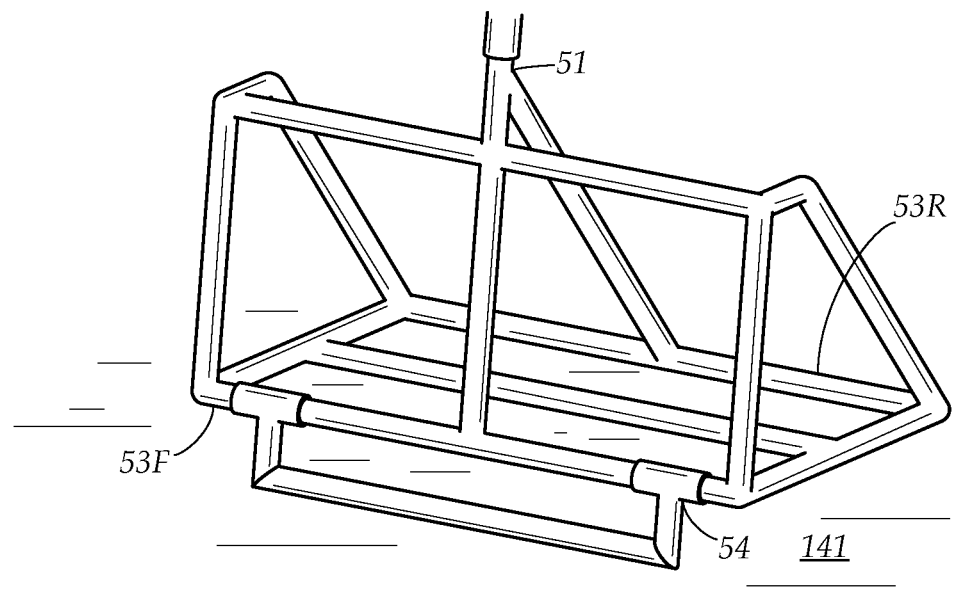
FIG. 3B is a diagrammatical perspective view of the base of the support frame, further showing a tilt adjustment bar attached to the base front adapted to control the elevation of the base in relation to the supporting surface, in accordance with an embodiment of the present disclosure.

Referring to FIG. 1 and FIGS. 3A-B, the base 50 is adapted to rest against the supporting surface 141 and support the upper assembly 34 so that the upper assembly is substantially perpendicular to the supporting surface 141. In a preferred embodiment, the base 50 has a lower base portion 52 adapted to contact the supporting surface 141, having a base front 53F and a base rear 53R which are parallel to each other, along with a pivot point 51 which extends upwardly to engage with the upper assembly 34. The base 50 may also have a tilt adjustment bar 54 which is hingedly connected to the base front 53F, which may be selectively lowered to lift the base front 53F and tilt the lower base portion 52 upwardly.

Referring to FIG. 1, FIGS. 10A-B, and FIG. 11, the upper assembly 34 has a pivot hinge 48 which is adapted to pivotally engage with the pivot point 51 extending upwardly from the base 50. The upper assembly 34 is therefore adapted to pivot laterally towards the right side 144R and left side 144L of the watercraft. In a preferred embodiment, the pivot hinge 48 may pivot laterally at least 90 degrees in relation to the bow 144A or the stern 144B, allowing the front end 14A of the trotline canister 12 to extend past the right or left sides 144R, 144L to allow the trotline 70 to be deployed in the water 150 alongside the watercraft 140.

Referring to FIG. 1, FIGS. 4A-C, and FIG. 7, the user may load the trotline 70 within the trotline canister 12 by inserting the trotline canister 12 into the retaining collar 32 in the elevated position 26C. The user may then place the mainline second end 71B into the interior space 20, and then sequentially engage the swivel 76 of each trotter 72 with the guide slot, beginning with the trotter 72 closest to the mainline second end 71B and ending with the trotter 72 closest to the mainline first end 71A. When all the swivels 76 are engaged within the guide slot 24, the user may then place the trotline canister 12 within the level position 26A, further causing the trotter 72 and hooks 78 to suspend perpendicularly in relation to the trotline canister 12. The user may then position the hook holder 60 over the hooks 78 to contain them within the central hook retaining space 64. Finally, the user may then position the trotline canister 12 in the intermediate position 26B to prevent the trotline canister 12 from rotating axially and from being elevated or depressed. In a preferred embodiment, the trotline canister 12 is placed in the intermediate position 26B in order to deploy the trotline 70.

Turning to FIGS. 1, 4A-C, 7-8, and 11, the support frame 30 is ideally positioned at either the bow 144A or the stern 144B of the watercraft 140, opposite the direction of movement of the watercraft 140. For example, the support frame 30 may be placed in the bow 144A to avoid entangling the trotline 70 in the motor 146, and the watercraft 140 may move reversibly in the direction of the stern 144B. When the trotline 70 is ready to be deployed, the hook holder 60 is removed, bait 82 is placed on the hooks 78, and the trotline canister 12 is placed in the intermediate position 26B. The individual trotters 72 and hooks 78 may remain suspended from the hook separator arms 39, thus ensuring that they do not become entangled with each other prior to deployment. The user then secures the mainline first end 71A to an anchoring point 152 such as a tree, post, or other fixed point, and takes a position 142 behind the support frame 30. The watercraft 140 then moves away from the anchoring point 152, pulling each of the swivels 76 out of the guide slot 24 in succession while the mainline 71 unfolds within the interior space 20 of the trotline canister 12 and is pulled forwardly through the opening 18. The trotters 72 and hooks 78 fall downward and the hooks 78 enter the water 150. The elevation locking frame 49 further prevents the trotline canister 12 from elevating, depressing, or rotating as the trotline deploys. Once the mainline second end 71B is pulled through the opening 18, the trotline 70 is fully deployed. The user, positioned 142 behind the support frame 30, is not required to contact the trotline 70 or the hooks 78 as the trotline is deployed, either to guide the trotline or apply bait to the hooks.

Figure 5:
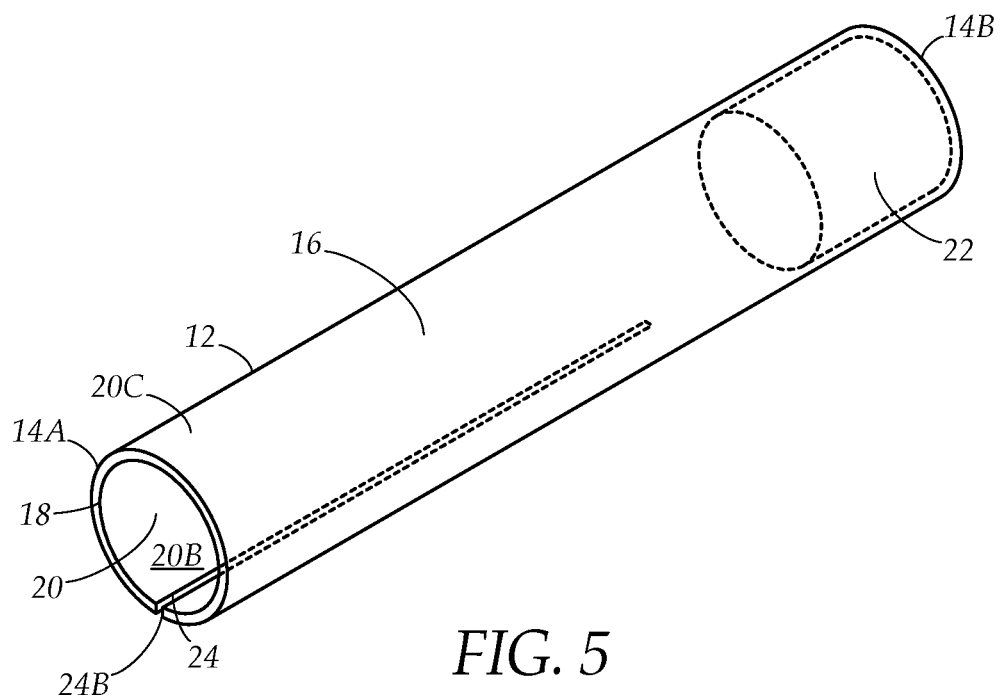
FIG. 5 is a diagrammatical perspective view of the trotline canister, showing a first and second end with an opening, an interior space, a foam plug within the interior space at the second end, and a guide slot extending from the opening toward the second end, in accordance with an embodiment of the present disclosure.

The trotline deployment apparatus contains certain safety features to prevent accidents in case the trotline 70 becomes entangled or otherwise fails to deploy correctly. In certain situations, the trotline 70 may become snagged within the trotline canister 12 during deployment, preventing the trotline from being pulled through the opening 18. The trotline canister 12 is adapted to slide outwardly through the retaining collar 32 and detach from the support frame 30, thus preventing the snagged trotline 70 from endangering the user or the watercraft 140. However, if the trotline canister 12 does not detach from the retaining collar 32, the entire support frame 30 is pulled off the watercraft 140 and into the water 150, as the base 50 is not attached to and merely rests upon the supporting surface 141 (as shown in FIG. 3A). These safety features prevent the trotline 70 from snapping during deployment. Referring to FIGS. 1, 5, and 11, the trotline canister 12 may have a foam plug 22 positioned within the interior space 20 proximate to the second end 14B, which allows the trotline canister 12 to float in the water 150 once detached in order to facilitate recovery. Furthermore, the support frame 30 is also adapted to float in the water. In a preferred embodiment, the upper assembly 34 and base 50 may be formed using hollow structural members such as closed hollow tubing. Alternatively, the support frame 30 may be fitted with foam or other flotation devices.

Referring to FIGS. 9A-B and 11, in certain cases, the weight 80 attached to the dropline 72B may be employed as the anchoring point 152, and floats may be attached to the mainline 71 via an additional dropline 72B to allow the mainline 71 to be located and recovered from the water 150.

Referring to FIGS. 1, 7, and 11, the trotline canisters 12 may be detached from the retaining collar 32 and stored with the trotline 70 contained within the interior space 20, by enclosing the hooks 78 using the hook holder 60, and wrapping the trotters 72 around the shell 16 of the trotline canister 12. Furthermore, multiple such trotline canisters 12 may be employed with the trotline deployment apparatus 10, each containing a separate trotline 70.

Referring to FIGS. 1, 7, and 11, the trotline deployment apparatus 10 may be any size. In a preferred embodiment, the trotline canister 12 may be approximately twenty-four inches long, while the guide slot 24 may be fourteen inches long, sufficient to accommodate fifty-six swivels 76. The hook separator arms 39 may be approximately fifteen inches long. In some embodiments, the trotters 72 may be color coded by length or the quantity of hooks 78 attached to the trotline 70, allowing the user to identify the trotline 70 when it is stored within the trotline canister 12. The components of the trotline deployment apparatus 10 may be enlarged or reduced in size as necessary to accommodate the length of the trotline.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a trotline deployment apparatus. The disclosure is illustrated by example in the drawing figures, and throughout the written description. It should be understood that numerous variations are possible, while adhering to the inventive concept. Such variations are contemplated as being a part of the present disclosure.

What is claimed is:

1. A trotline deployment apparatus for storing and deploying a trotline having a mainline with a mainline first end and a mainline second end, a plurality of trotters sequentially connected to the mainline between the mainline first and second ends via a plurality of swivels, each of the trotters is attached to one of a plurality of hooks adapted for fishing, the trotline deployment apparatus is adapted for use on a watercraft having a supporting surface, the trotline deployment apparatus comprising:

a trotline canister having a first end, a distally oriented second end, a hollow shell extending between the first and second ends, an interior space formed within the hollow shell which opens forwardly through an opening positioned at the first end, the trotline canister further having a guide slot extending from the opening towards the second end and is adapted to slidably engage each swivel of the plurality of swivels, the interior space is adapted to receive and contain the mainline whereby the guide slot is adapted to sequentially receive and engage the swivel of each trotter of the plurality of trotters between the mainline first and second ends such that the mainline folds within the interior space, the trotline canister is further adapted to allow the trotline to be deployed, by allowing the mainline first end to be pulled away from the first end while sequentially disengaging each swivel of the plurality of swivels from the guide slot; and a support frame having an upper assembly and a base, the upper assembly having a retaining collar adapted to receive and retain the trotline canister such that the first end of the trotline canister projects forwardly away from the upper assembly and the guide slot is oriented towards the supporting surface to allow the trotters and hooks to hang downwardly, the base is adapted to support the upper assembly in an upright position relative to the supporting surface, the upper assembly further has a hook separator arm positioned below and laterally separated from the retaining collar, the hook separator arm projects forwardly away from the upper assembly and is parallel to the trotline canister within the retaining collar, the hook separator arm is adapted to allow each trotter of the plurality of trotters to hang therefrom such that the hook separator arm contacts the trotter between the hook and the swivel.

2. The trotline deployment apparatus as described in claim 1, further comprising:

a hook holder having a first panel with a first panel inner face, and a second panel with a second panel inner face, the hook holder having a central hook retaining space defined by the first panel inner face and the second panel inner face, the hook holder is adapted to selectively enclose the plurality of hooks within the central hook retaining space while the hooks are suspended below the trotline canister.

3. The trotline deployment apparatus as described in claim 2, wherein:

the upper assembly further has an elevated hook separator arm positioned above and laterally separated from the retaining collar, the elevated hook separator arm projects forwardly away from the upper assembly and is parallel to the trotline canister within the retaining collar, the elevated hook separator arm is adapted to allow each trotter of the plurality of trotters to hang therefrom such that the upper hook separator arm contacts the trotter between the hook and the swivel.

4. The trotline deployment apparatus as described in claim 2, wherein:

the retaining collar is adapted to detachably release the trotline canister upon the trotline becoming snagged during deployment, allowing the trotline canister to be pulled forwardly away from the upper assembly.

5. The trotline deployment apparatus as described in claim 4, wherein:

the upper assembly further has an elevation hinge which hingedly connects the retaining collar to the upper assembly, the elevation hinge is adapted to allow the trotline canister to alternatively elevate and depress between a level position, an elevated position whereby the first end of the trotline canister points upwardly, and an intermediate position therebetween.

6. The trotline deployment apparatus as described in claim 5, wherein:

the retaining collar is further slidably engaged with the trotline canister and is adapted to allow the trotline canister to alternatively slide inwardly and outwardly.

7. The trotline deployment apparatus as described in claim 6, wherein:

the upper assembly further has an elevation locking frame positioned behind the retaining collar and is adapted to selectively lock the trotline canister in the level, intermediate, and elevated positions.

8. The trotline deployment apparatus as described in claim 7, wherein:

the upper assembly and the base are pivotally engaged via a pivot hinge adapted to allow the upper assembly to pivot laterally.

9. The trotline deployment apparatus as described in claim 8, wherein:

the trotline canister further has a foam plug within the interior space at the second end of the trotline canister, which is adapted to allow the trotline canister to float in water.

10. The trotline deployment apparatus as described in claim 9, wherein:

the upper assembly and the base are formed using hollow structural members adapted to allow the support frame to float in water.

11. The trotline deployment apparatus as described in claim 10, wherein:

the base has a base front and a base rear adapted to rest against the supporting surface, the base further having a tilt adjustment bar adapted to tilt the support frame upwardly by lifting the base front away from the supporting surface.

12. A method for deploying a trotline from a watercraft floating upon a body of water, the watercraft having a horizontally positioned supporting surface, the trotline having a mainline with a mainline first end and a mainline second end, the trotline further having a plurality of trotters sequentially connected to the mainline via a plurality of swivels positioned between the mainline first end and mainline second end, each trotter of the plurality of trotters is attached to one of a plurality of hooks adapted for fishing, the method comprising the steps of:

providing a trotline canister having a first end, a distally oriented second end, a hollow shell extending between the first and second ends, and an interior space formed within the hollow shell which opens forwardly through an opening positioned at the first end, the trotline canister further having a guide slot extending from the opening towards the second end which is adapted to slidably engage each swivel of the plurality of swivels;

providing a support frame having an upper assembly and a base, the upper assembly having a retaining collar adapted to receive and retain the trotline canister, the base is adapted to support the upper assembly in an upright position relative to the supporting surface, the upper assembly further has a hook separator arm which is positioned below and is laterally separated from the retaining collar, the hook separator arm projects forwardly away from the upper assembly;

mounting the trotline canister on the support frame by inserting the second end of the trotline canister through the retaining collar such that the first end of the trotline canister projects forwardly away from the upper assembly;

loading the trotline canister by inserting the mainline second end into the interior space through the opening, sequentially engaging each swivel of the plurality of swivels within the guide slot and causing the mainline to fold within the interior space from the mainline second end towards the mainline first end;

attaching bait to the plurality of hooks;

attaching the mainline first end to an anchoring point, and moving the watercraft away from the anchoring point;

deploying the trotline by pulling the mainline outwardly through the opening using the movement of the watercraft, sequentially disengaging the swivels of the plurality of swivels from the guide slot from the mainline first end towards the mainline second end and causing the hooks to fall into the water.

13. The method as described in claim 12, wherein:
the support frame further has an elevation hinge which hingedly connects the retaining collar to the upper assembly and allows the trotline canister to selectively elevate and depress between a level position, an elevated position whereby the first end of the trotline canister points upwardly, and an intermediate position therebetween;
the step of loading the trotline canister is preceded by the step of:
placing the trotline canister in the elevated position;
the step of loading the trotline canister by inserting the mainline second end into the interior space through the opening, sequentially engaging each swivel of the plurality of swivels within the guide slot and causing the mainline to fold within the interior space from the mainline second end towards the mainline first end, is followed by the step of:
placing the trotline canister in the level position; and
the step of deploying the trotline by pulling the mainline outwardly through the opening using the movement of the watercraft, is preceded by the step of:
placing the trotline canister in the intermediate position.

14. The method as described in claim 13, wherein:
the step of placing the trotline canister in the level position is followed by the steps of:
hanging each trotter of the plurality of trotters over the hook separator arm such that the hook separator arm contacts the trotter between the hook and the swivel, separating the hooks and trotters by creating a separation distance between each trotter of the plurality of trotters hanging from the hook separator arm.

15. The method as described in claim 14, wherein:
the trotline further has a dropline attached to the mainline via one of the swivels, and a weight attached to the dropline, the dropline exceeding the trotters in length;
the upper assembly further has an elevated hook separator arm which is positioned above and is laterally separated from the retaining collar, the elevated hook separator arm projects forwardly away from the upper assembly; and
the step of hanging each trotter of the plurality of trotters over the hook separator arm such that the hook separator arm contacts the trotter between the hook and the swivel, is followed by the step of hanging the dropline over the elevated hook separator arm such that the elevated hook separator arm contacts the dropline between the weight and the one of the swivels.

16. The method as described in claim 15, wherein:
the step of providing a support frame having an upper assembly and a base is followed by the step of:
providing a hook holder having a first panel, a second panel which is parallel and adjacent to the first panel, and a central hook retaining space formed between the first and second panels; the step of placing the trotline canister in the level position is followed by the step of:
preventing unintended contact with the hooks by enclosing the plurality of hooks within the central hook retaining space of the hook holder; and
the step of hanging each trotter of the plurality of trotters over the hook separator arm such that the hook separator arm contacts the trotter between the hook and the swivel, is preceded by the step of:
removing the hook holder and exposing the hooks.

17. The method as described in claim 16, wherein:
the watercraft further has a bow, a stern, a right side, and a left side, the supporting surface is positioned proximate to the bow or the stern; and
the step of mounting the trotline canister on the supporting frame by inserting the second end of the trotline canister through the retaining collar such that the first end of the trotline canister projects forwardly away from the upper assembly, is preceded by the step of:
positioning the support frame upon the supporting surface of the watercraft such that the support frame faces the water.

18. The method as described in claim 17, wherein:
the upper assembly is pivotally connected to the base via a pivot hinge adapted to allow the upper assembly to pivot laterally; and
the step of deploying the trotline by pulling the mainline outwardly through the opening using the movement of the watercraft is preceded by the step of:
pivoting the upper assembly such that the first end of the trotline canister extends past the left or right side of the watercraft.

19. The method as described in claim 18, where the steps as recited are followed by the step of:
detaching the trotline canister from the retaining collar by outwardly sliding the trotline canister, and preventing the trotline from snapping from the movement of the watercraft upon the trotline becoming snagged during deployment.

* * * * *